| (12) United States Patent | (10) Patent No.: US 8,158,701 B1 |
|---|---|
| Gallucci et al. | (45) Date of Patent: Apr. 17, 2012 |

(54) NON-HALOGENATED FLAME RETARDANT POLYCARBONATE COMPOSTIONS

(75) Inventors: Robert Russell Gallucci, Mt. Vernon, IN (US); Srinivas Siripurapu, Evansville, IN (US); Amit S. Kulkarni, Evansville, IN (US)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 0 days.

(21) Appl. No.: 13/019,443

(22) Filed: Feb. 2, 2011

(51) Int. Cl.
 *C08K 5/51* (2006.01)
(52) U.S. Cl. .......................... 524/128; 524/451; 525/67
(58) Field of Classification Search .................. 524/128
 See application file for complete search history.

(56) References Cited

U.S. PATENT DOCUMENTS

| 5,162,419 | A * | 11/1992 | Pottier-Metz et al. | ........ 524/451 |
| 6,541,548 | B2 | 4/2003 | Weidner et al. | |
| 7,119,140 | B2 | 10/2006 | Basham et al. | |
| 7,250,127 | B2 * | 7/2007 | Geck et al. | ..................... 264/142 |
| 7,393,869 | B2 | 7/2008 | Zhang et al. | |
| 2002/0077392 | A1 * | 6/2002 | Lim et al. | ........................ 524/96 |
| 2006/0079615 | A1 * | 4/2006 | DeRudder et al. | ............ 524/128 |
| 2007/0299169 | A1 * | 12/2007 | Ohira et al. | ................... 524/100 |
| 2008/0004373 | A1 * | 1/2008 | Volkers et al. | ................ 523/200 |
| 2008/0103267 | A1 | 5/2008 | Hurst et al. | |

OTHER PUBLICATIONS

Chemical and Physical Properties of Kronos TiO2 Grade.*
Chemical and Physical Properties of Kronos TiO2 Grade, date unknown.*

* cited by examiner

*Primary Examiner* — Doris Lee
(74) *Attorney, Agent, or Firm* — Richard M. Klein; Fay Sharpe LLP

(57) ABSTRACT

Polycarbonate compositions are disclosed that have high flame retardance, good mechanical properties, and low halogen content. The compositions comprise a polycarbonate, a grafted butadiene rubber, a phosphorous-containing flame retardant, and a combination of a silicone-containing functionality with fumed silica.

20 Claims, No Drawings

NON-HALOGENATED FLAME RETARDANT POLYCARBONATE COMPOSTIONS

BACKGROUND

The present disclosure relates to polycarbonate compositions that have increased flame retardance and reduced halogen content. Also disclosed are methods for preparing and/or using the same.

Polycarbonates (PC) are synthetic engineering thermoplastic resins derived from bisphenols and phosgene, or their derivatives. They are linear polyesters of carbonic acid and can be formed from dihydroxy compounds and carbonate diesters, or by ester interchange. Polycarbonates are a useful class of polymers having many desired properties, such as optical clarity, good impact strength, and higher heat distortion temperature (HDT).

Polycarbonate polymers and their blends with vinyl polymers are not inherently non-flammable. It is thus typically necessary to include flame retardant additives that retard the flammability of the resin and/or reduce dripping. Polytetrafluoroethylene (PTFE), particular fibrous PTFE, has long been used as an antidrip additive for many flame retardant applications. However, PTFE when burned will give off corrosive and toxic gases, including hydrofluoric acid (HF), which can be a danger to people and electronic equipment. Such halogenated flame retardants are also increasingly subject to regulatory restrictions. Reducing the halogen content while meeting flame retardance requirements typically involves the use of high molecular weight polycarbonates that reduce the flow of the polycarbonate and its blends. This reduction in flow properties makes their use more difficult in various manufacturing processes.

There remains a need in the art for non-halogenated flame retardant polycarbonate compositions that maintain their mechanical properties.

BRIEF DESCRIPTION

Disclosed, in various embodiments, are polymeric compositions that are flame retardant yet contain little to no halogen content. The compositions also maintain their mechanical properties. Such compositions have many useful applications.

Also disclosed in embodiments is a flame-retardant polycarbonate blend comprising: from about 50 wt % to about 90 wt % of a polycarbonate polymer; from about 3 wt % to about 30 wt % of a grafted butadiene rubber; from about 5 wt % to about 16 wt % of a phosphorus-containing flame retardant; and from about 0.3 wt % to about 3 wt % of a crosslinked silicone rubber containing silica. The blend contains less than 500 ppm halogen content, has a melt volume rate of at least 15 cc/10 min at 260° C. when measured per ASTM D1238, has a notched Izod impact strength of 480 J/m or greater when measured per ASTM D256, and has a heat distortion temperature of 75° C. or greater at 1.82 MPa when measured per ASTM D648. In further embodiments, the polycarbonate blend contains less than 100 ppm or less than 50 ppm halogen content.

The grafted butadiene rubber may be acrylonitrile-butadiene-styrene (ABS), methacrylate-butadiene-styrene (MBS), or a mixture thereof.

The silica may be from 5 wt % to 50 wt % of the weight of the crosslinked silicone rubber and the silica.

The polycarbonate blend may further comprise from 6 wt % to 7 wt % of a styrene-acrylonitrile (SAN) copolymer; from 0.001 wt % to 0.3 wt % of a stabilizer; and/or from 1 wt % to 5 wt % of a mineral filler. The mineral filler is talc or kaolin clay or a mixture thereof.

The polycarbonate blend may also have a multiaxial impact energy at maximum load of over 50 Joules at 23° C. and at 0° C. when measured per ASTM D3763, a tensile modulus of 3200 MPa or greater when measured per ASTM D638, a tensile strength at yield of 45 MPa or greater when measured per ASTM D638, and greater than 100% elongation at break when measured per ASTM D638.

In particular embodiments, the polycarbonate blend comprises from 70 wt % to 90 wt % of the polycarbonate polymer; from 3 wt % to 7 wt % of the grafted butadiene rubber; from 8 wt % to 9 wt % of the phosphorus-containing flame retardant; and from 0.3 wt % to 3 wt % of the crosslinked silicone rubber containing silica.

Disclosed in embodiments is a composition comprising: from about 50 wt % to about 90 wt % of a polycarbonate having a weight average molecular weight of from about 15,000 to about 50,000 daltons; from about 3 wt % to about 30 wt % of ABS, MBS, or a mixture thereof, having from about 15% to about 80% grafted polybutadiene; from about 5 wt % to about 16 wt % of an aryl phosphate having a molecular weight of from about 350 to about 1000 daltons; and about 0.3 wt % to about 5.0 wt % of a combination of a silicone-containing functionality and fumed silica. The silicone-containing functionality comprises from about 0.1% to about 10% vinyl units and from about 0.1% to about 20% silicone linkages of T or Q structure. The fumed silica has a surface area of 100 to 300 $m^2/g$ when measured per ASTM D1993, a weight loss on drying at 300° C. of less than 15 wt %, an aggregate particle size of from 0.1 μm to 1.0 μm and less than 0.1% crystalline silica. The fumed silica is present in an amount of 5 to 50 wt % of the combination of silicone-containing functionality and fumed silica. The composition has a MVR of at least 15 cc/10 minutes when measured at 260° C./2.16 Kg per ASTM D1238, a UL-94 rating of at least V-1 at 2.0 mm, and a change in melt viscosity when held at 260° C. for 30 minutes of less than 15% from the initial melt viscosity, when measured per ASTM D4440.

The composition may have less than 50 ppm halogen content. The composition may have less than 50 ppm of antimony, lead, cadmium, mercury, arsenic, thallium, or mixtures thereof. The composition may have less than 50 ppm of a polytetrafluoroethylene.

The combination of the silicone-containing functionality and fumed silica may contain from about 20 wt % to about 50 wt % fumed silica. The combination may also be provided as a pre-compounded pellet for adding to the polymeric composition.

Besides the aforementioned properties, the composition may additionally have a notched Izod impact strength at 23° C. of 480 J/m or greater when measured per ASTM D256 and a heat distortion temperature at 1.82 MPa of 75° C. or greater when measured per ASTM D648.

The composition may further comprise 0.1 to 10.0 wt % of a silica-alumina encapsulated titanium dioxide, wherein the titanium dioxide has a particle size of less than 5 microns and has been passivated by treatment with a silicon compound selected from the group consisting of hydrogen silanes, $C_1$ to $C_3$ mono-alkoxy silanes, $C_1$ to $C_3$ di-alkoxy silanes, $C_1$ to $C_3$ tri-alkoxy silanes, and mixtures thereof.

The composition may further comprise from about 1 wt % to about 15 wt % of a non-rubber grafted SAN having a weight average molecular weight (Mw) of from about 70,000 to about 170,000 daltons.

The aryl phosphate in the composition may have less than 5% of triphenyl phosphate.

The composition may further comprise from about 1 wt % to about 30 wt % of a mineral comprising talc or kaolin clay, wherein the mineral has a particle size of less than 10 microns and has a weight loss at 300° C. of less than 5 wt %.

The composition may further comprise from about 0.001 wt % to about 0.3 wt % of a stabilizer selected from the group consisting of phosphites, phosphonites, hindered phenols, and mixtures thereof.

The polycarbonate in the composition may be a branched polycarbonate that has been branched with from about 0.01 mole % to about 0.5 mole % of a trifunctional phenol.

These and other non-limiting characteristics are more particularly described below.

DETAILED DESCRIPTION

The present disclosure may be understood more readily by reference to the following detailed description of desired embodiments and the examples included therein. In the following specification and the claims which follow, reference will be made to a number of terms which shall be defined to have the following meanings.

The singular forms "a," "an," and "the" include plural referents unless the context clearly dictates otherwise.

As used in the specification and in the claims, the term "comprising" may include the embodiments "consisting of" and "consisting essentially of."

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4."

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups are defined to comprise at least one carbon atom. The array of atoms may include heteroatoms such as nitrogen, sulfur, silicon, selenium and oxygen in the backbone or may be composed exclusively of carbon and hydrogen. Aliphatic groups may be substituted or unsubstituted. Exemplary aliphatic groups include, but are not limited to, methyl, ethyl, isopropyl, isobutyl, hydroxymethyl (—CH$_2$OH), mercaptomethyl (—CH$_2$SH), methoxy, methoxycarbonyl(CH$_3$OCO—), nitromethyl (—CH$_2$NO$_2$), and thiocarbonyl.

The term "alkyl" refers to a linear or branched array of atoms that is composed exclusively of carbon and hydrogen. The array of atoms may include single bonds, double bonds, or triple bonds (typically referred to as alkane, alkene, or alkyne). Alkyl groups may be substituted (i.e. one or more hydrogen atoms is replaced) or unsubstituted. Exemplary alkyl groups include, but are not limited to, methyl, ethyl, and isopropyl.

The term "aromatic" refers to an array of atoms having a valence of at least one and comprising at least one aromatic group. The array of atoms may include heteroatoms such as nitrogen, sulfur, selenium, silicon and oxygen, or may be composed exclusively of carbon and hydrogen. The aromatic group may also include nonaromatic components. For example, a benzyl group is an aromatic group that comprises a phenyl ring (the aromatic component) and a methylene group (the nonaromatic component). Exemplary aromatic groups include, but are not limited to, phenyl, pyridyl, furanyl, thienyl, naphthyl and biphenyl. 4-

The term "cycloaliphatic" refers to an array of atoms which is cyclic but which is not aromatic. The cycloaliphatic group may include heteroatoms such as nitrogen, sulfur, selenium, silicon and oxygen in the ring, or may be composed exclusively of carbon and hydrogen. A cycloaliphatic group may comprise one or more noncyclic components. For example, a cyclohexylmethyl group (C$_6$H$_{11}$CH$_2$) is a cycloaliphatic functionality, which comprises a cyclohexyl ring (the array of atoms which is cyclic but which is not aromatic) and a methylene group (the noncyclic component). Exemplary cycloaliphatic groups include, but are not limited to, cyclopropyl, cyclobutyl, 1,1,4,4-tetramethylcyclobutyl, piperidinyl, and 2,2,6,6-tetramethylpiperydinyl.

The term "cycloalkyl" refers to an array of atoms which is cyclic but is not aromatic, and which is composed exclusively of carbon and hydrogen. Cycloalkyl groups may be substituted or unsubstituted.

The term "aryl" refers to an array of atoms which is aromatic and which is composed exclusively of carbon and hydrogen. Aryl groups may be substituted or unsubstituted. An exemplary aryl group is phenyl.

The term "perfluoroalkyl" refers to a linear or branched array of atoms that is composed exclusively of carbon and fluorine.

It should be noted that two bases are used in the discussion in this application. One basis is the weight percentage or "wt %", which is based on the total weight of the polymeric composition, unless otherwise noted. The second basis is parts per hundred or "phr". The hundred refers to one hundred parts by weight of the polymeric components of the polymeric composition. The other components added to the polymeric components are described in terms of the amounts that need to be added to each one hundred parts of the polymer components. There is a slight difference between these two bases, so that for example, 5 wt % is not necessarily equivalent to 5 phr.

The polymeric compositions of the present disclosure comprise (A) a polycarbonate polymer; (B) a grafted butadiene rubber; (C) an aryl phosphate flame retardant; and (D) a combination of a silicone-containing functionality and fumed silica. Put another way, the polymeric compositions of the present disclosure comprise (A) a polycarbonate polymer; (B) a grafted butadiene rubber; (C) a phosphorous-containing flame retardant; and (D) a crosslinked silicone rubber containing silica. The polymeric compositions also have a combination of desirable properties, particularly the melt volume rate (MVR) with other mechanical properties.

As used herein, the terms "polycarbonate" and "polycarbonate polymer" mean compositions having repeating structural carbonate units of the formula (1):

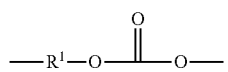
(1)

in which at least about 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

$-A^1-Y^1-A^2-$ (2)

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, wherein $R^1$ is as defined above. Dihydroxy compounds suitable in an interfacial reaction include the dihydroxy compounds of formula (A) as well as dihydroxy compounds of formula (3)

HO-$A^1$-$Y^1$-$A^2$-OH (3)

wherein $Y^1$, $A^1$ and $A^2$ are as described above. Also included are bisphenol compounds of general formula (4):

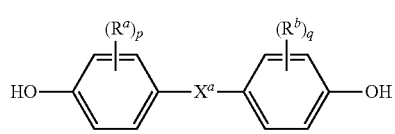
(4)

wherein $R^a$ and $R^b$ each represent a halogen atom or a monovalent hydrocarbon group and may be the same or different; p and q are each independently integers of 0 to 4; and $X^a$ represents one of the groups of formula (5):

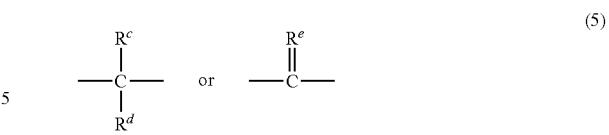
(5)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds that may be represented by formula (3) include 1,1-bis(4-hydroxyphenyl)methane, 1,1-bis(4-hydroxyphenyl)ethane, 2,2-bis(4-hydroxyphenyl)propane (hereinafter "bisphenol-A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane (THPE), isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. All types of polycarbonate end groups are contemplated as being useful in the polycarbonate composition, provided that such end groups do not significantly affect desired properties of the thermoplastic compositions. The branching agents may be added at a level of about 0.05 wt % to about 2.0 wt %.

In particular embodiments, the polycarbonate is a branched polycarbonate that has been branched with from about 0.01 mole % to about 0.5 mole % of a trifunctional phenol, i.e. a compound having one phenol group and at least two other functional groups (which can also be phenol if desired).

"Polycarbonates" and "polycarbonate polymers" as used herein further includes blends of polycarbonates with other copolymers comprising carbonate chain units. An exemplary copolymer is a polyester carbonate, also known as a copolyester-polycarbonate. Such copolymers further contain, in addition to recurring carbonate chain units of the formula (1), repeating units of formula (6)

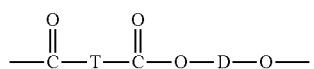
(6)

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

(7)

wherein each $R^k$ is independently a $C_{1-10}$ hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalene-dicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 10:1 to about 0.2:9.8. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In other embodiments, poly(alkylene terephthalates) may be used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also contemplated are the above polyesters with a minor amount, e.g., from about 0.5 to about 10 percent by weight, of units derived from an aliphatic diacid and/or an aliphatic polyol to make copolyesters.

Copolymers comprising alkylene terephthalate repeating ester units with other ester groups may also be useful. Useful ester units may include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s may also include poly(alkylene cyclohexanedicarboxylate)s. Of these, a specific example is poly(1,4-cyclohexane-dimethanol-1,4-cyclohexanedicarboxylate) (PCCD), having recurring units of formula (8):

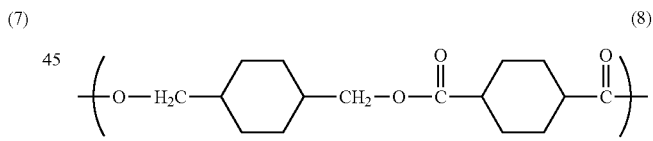
(8)

wherein, as described using formula (6), $R^2$ is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination comprising at least one of the foregoing isomers.

Another exemplary copolymer comprises polycarbonate blocks and polydiorganosiloxane blocks, also known as a polycarbonate-polysiloxane copolymer. The polycarbonate blocks in the copolymer comprise repeating structural units of formula (1) as described above, for example wherein $R^1$ is of formula (2) as described above. These units may be derived from reaction of dihydroxy compounds of formula (3) as described above.

The polydiorganosiloxane blocks comprise repeating structural units of formula (9) (sometimes referred to herein as 'siloxane'):

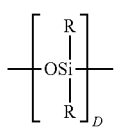 (9)

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups may be used in the same copolymer.

The value of D in formula (9) may vary widely depending on the type and relative amount of each component in the thermoplastic composition, the desired properties of the composition, and like considerations. Generally, D may have an average value of 2 to about 1000, specifically about 2 to about 500, more specifically about 5 to about 100. In one embodiment, D has an average value of about 10 to about 75, and in still another embodiment, D has an average value of about 40 to about 60. Where D is of a lower value, e.g., less than about 40, it may be desirable to use a relatively larger amount of the polycarbonate-polysiloxane copolymer. Conversely, where D is of a higher value, e.g., greater than about 40, it may be necessary to use a relatively lower amount of the polycarbonate-polysiloxane copolymer.

A combination of a first and a second (or more) polycarbonate-polysiloxane copolymers may be used, wherein the average value of D of the first copolymer is less than the average value of D of the second copolymer.

In one embodiment, the polydiorganosiloxane blocks are provided by repeating structural units of formula (10):

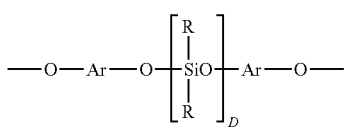 (10)

wherein D is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (10) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarlyene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Such units may be derived from the corresponding dihydroxy compound of the following formula (11):

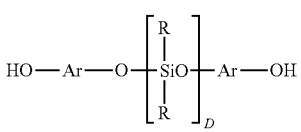 (11)

wherein Ar and D are as described above. Such compounds are further described in U.S. Pat. No. 4,746,701 to Kress et al. Compounds of this formula may be obtained by the reaction of a dihydroxyarylene compound with, for example, an alpha, omega-bisacetoxypolydiorangonosiloxane under phase transfer conditions.

In another embodiment the polydiorganosiloxane blocks comprise repeating structural units of formula (12):

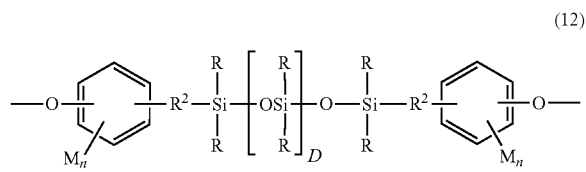 (12)

wherein R and D are as defined above. $R^2$ in formula (12) is a divalent $C_2$-$C_8$ aliphatic group. Each M in formula (12) may be the same or different, and may be cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is an alkyl group such as methyl, ethyl, or propyl, an alkoxy group such as methoxy, ethoxy, or propoxy, or an aryl group such as phenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl or tolyl. In another embodiment, R is methyl, or a mixture of methyl and phenyl. In still another embodiment, M is methoxy, n is one, $R^2$ is a divalent $C_1$-$C_3$ aliphatic group, and R is methyl.

These units may be derived from the corresponding dihydroxy polydiorganosiloxane (13):

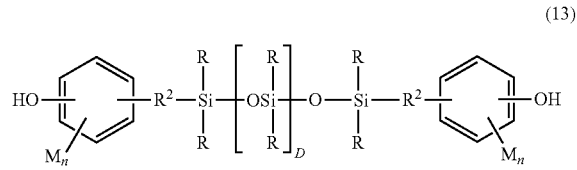 (13)

wherein R, D, M, $R^2$, and n are as described above.

Such dihydroxy polysiloxanes can be made by effecting a platinum catalyzed addition between a siloxane hydride of the formula (14),

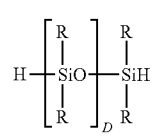 (14)

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-t-butoxyphenol, 4-phenyl-2-phenylphenol, 2-methyl-4-propylphenol, 2-allyl-4,6-dimethylphenol, 2-allyl-6-methoxy-4-methylphenol and 2-allyl-4,6-dimethylphenol. Mixtures comprising at least one of the foregoing may also be used.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformate of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Rather than utilizing the dicarboxylic acid per se, it is possible, and sometimes even desired, to employ the reactive derivatives of the acid, such as the corresponding acid halides, in particular the acid dichlorides and the acid dibromides. Thus, for example, instead of using isophthalic acid, terephthalic acid, or mixtures thereof, it is possible to employ isophthaloyl dichloride, terephthaloyl dichloride, and mixtures thereof.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or a $C_{6-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst may be about 0.1 to about 10 wt % based on the weight of bisphenol in the phosgenation mixture. In another embodiment an effective amount of phase transfer catalyst may be about 0.5 to about 2 wt % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

A polycarbonate-polysiloxane copolymer may be manufactured by reaction of diphenolic polysiloxane (13) with a carbonate source and a dihydroxy aromatic compound of formula (3), optionally in the presence of a phase transfer catalyst as described above. Suitable conditions are similar to those useful in forming polycarbonates. For example, the copolymers are prepared by phosgenation, at temperatures from below 0° C. to about 100° C., desirably about 25° C. to about 50° C. Since the reaction is exothermic, the rate of phosgene addition may be used to control the reaction temperature. The amount of phosgene required will generally depend upon the amount of the dihydric reactants. Alternatively, the polycarbonate-polysiloxane copolymers may be prepared by co-reacting in a molten state, the dihydroxy monomers and a diaryl carbonate ester, such as diphenyl carbonate, in the presence of a transesterification catalyst as described above. Siloxane groups may also be present at or attached to the ends of the copolymer as well.

In the production of a polycarbonate-polysiloxane copolymer, the amount of dihydroxy polydiorganosiloxane is selected so as to provide the desired amount of polydiorganosiloxane units in the copolymer. The amount of polydiorganosiloxane units may vary widely, i.e., may be about 1 wt % to about 99 wt % of polydimethylsiloxane, or an equivalent molar amount of another polydiorganosiloxane, with the balance being carbonate units. The particular amounts used will therefore be determined depending on desired physical properties of the thermoplastic composition, the value of D (within the range of 2 to about 1000), and the type and relative amount of each component in the thermoplastic composition, including the type and amount of polycarbonate, type and amount of impact modifier, type and amount of polycarbonate-polysiloxane copolymer, and type and amount of any other additives. Suitable amounts of dihydroxy polydiorganosiloxane can be determined by one of ordinary skill in the art without undue experimentation using the guidelines taught herein. For example, the amount of dihydroxy polydiorganosiloxane may be selected so as to produce a copolymer comprising about 1 wt % to about 75 wt %, or about 1 wt % to about 50 wt % polydimethylsiloxane, or an equivalent molar amount of another polydiorganosiloxane. In one embodiment, the copolymer comprises about 5 wt % to about 40 wt %, optionally about 5 wt % to about 25 wt % polydimethylsiloxane, or an equivalent molar amount of another polydiorganosiloxane, with the balance being polycarbonate. In a particular embodiment, the copolymer may comprise about 20 wt % siloxane.

In specific embodiments, the polycarbonate polymer is derived from a dihydroxy compound having the structure of Formula (1):

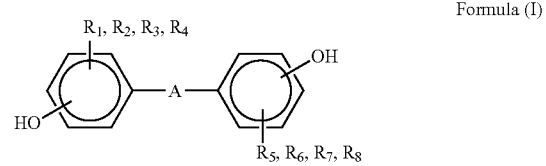

Formula (I)

wherein $R_1$ through $R_8$ are each independently selected from hydrogen, nitro, cyano, $C_1$-$C_{20}$ alkyl, $C_4$-$C_{20}$ cycloalkyl, and $C_6$-$C_{20}$ aryl; and A is selected from a bond, —O—, —S—, —$SO_2$—, $C_1$-$C_{12}$ alkyl, $C_6$-$C_{20}$ aromatic, and $C_6$-$C_{20}$ cycloaliphatic.

In specific embodiments, the dihydroxy compound of Formula (I) is 2,2-bis(4-hydroxyphenyl)propane (i.e. bisphenol-A or BPA). Other illustrative compounds of Formula (I) include: 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 1,1-bis(4-hydroxyphenyl)cyclohexane; 4,4' dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; and 1,3-bis(2-(4-hydroxyphenyl)-2-propyl)benzene.

In more specific embodiments, the polycarbonate polymer (A) is a bisphenol-A homopolymer. Exemplary bisphenol-A polymers may have a weight average molecular weight (Mw) from 15,000 to 50,000 daltons, according to polycarbonate standards.

The polymeric composition also comprises (B) a grafted butadiene rubber. The grafted butadiene rubber is an elastomer-modified graft copolymer comprising (i) an elastomeric (i.e., rubbery) polymer substrate having a Tg less than 10° C., more specifically less than −10° C., or more specifically −40° to −80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than 50 wt % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers.

Suitable conjugated diene monomers for preparing the elastomer phase are of formula (15):

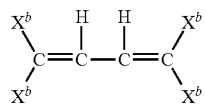

(15)

wherein each $X^b$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Vinyl aromatic compounds may be copolymerized with the ethylenically unsaturated nitrile monomer to forma a copolymer, wherein the vinylaromatic compounds can include monomers of formula (16):

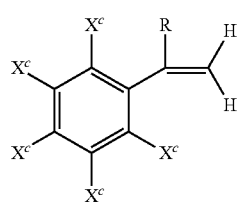

(16)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ arylalkyl, $C_7$-$C_{12}$ alkylaryl, $C_1$-$C_{12}$ alkoxy, $C_3$-$C_{12}$ cycloalkoxy, $C_6$-$C_{12}$ aryloxy, or hydroxy, and R is hydrogen or $C_1$-$C_5$ alkyl. Examples of suitable monovinylaromatic monomers that may be used include styrene, 3-methylstyrene, 3,5-diethylstyrene, 4-n-propylstyrene, alpha-methylstyrene, alpha-methyl vinyltoluene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers of the generic formula (17):

(17)

wherein R is hydrogen or $C_1$-$C_5$ alkyl; and $X^c$ is $C_1$-$C_{12}$ alkoxycarbonyl, $C_1$-$C_{12}$ aryloxycarbonyl, hydroxy carbonyl, or the like. Examples of monomers of formula (17) include, acrylic acid, methyl(meth)acrylate, ethyl(meth)acrylate, n-butyl(meth)acrylate, t-butyl(meth)acrylate, n-propyl (meth)acrylate, isopropyl(meth)acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

Suitable (meth)acrylate monomers suitable for use as the elastomeric phase may be cross-linked, particulate emulsion homopolymers or copolymers of $C_{1-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers may optionally be polymerized in admixture with up to 15 wt % of comonomers of formulas (15), (16), or (17). Exemplary comonomers include but are not limited to butadiene, isoprene, styrene, methyl methacrylate, phenyl methacrylate, penethylmethacrylate, N-cyclohexylacrylamide, vinyl methyl ether, and mixtures comprising at least one of the foregoing comonomers. Optionally, up to 5 wt % of a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth) acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of 0.001 to 25 micrometers, specifically 0.01 to 15 micrometers, or even more specifically 0.1 to 8 micrometers may be used for emulsion based polymerized rubber lattices. A particle size of 0.5 to 10 micrometers, specifically 0.6 to 1.5 micrometers may be used for bulk polymerized rubber substrates. Particle size may be measured by simple light transmittance methods or capillary hydrodynamic chromatography (CHDF). The elastomer phase may be a particulate, moderately cross-linked conjugated butadiene or $C_{4-6}$ alkyl acrylate rubber, and preferably has a gel content greater than 70 wt %. Also suitable are mixtures of butadiene with styrene and/or $C_{4-6}$ alkyl acrylate rubbers.

The elastomeric phase may provide 5 to 95 wt % of the total graft copolymer, more specifically 20 to 90 wt %, and even more specifically 40 to 85 wt % of the elastomer-modified graft copolymer, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above-described monovinylaromatic monomers of formula (16) may be used in the rigid graft phase, including styrene, alpha-methyl styrene, vinyltoluene, vinylxylene, butylstyrene, para-hydroxystyrene, methoxystyrene, or the like, or combinations comprising at least one of the foregoing monovinylaromatic monomers. Suitable comonomers include, for example, the above-described monovinylic monomers and/or monomers of the general formula (17). In one embodiment, R is hydrogen or $C_1$-$C_2$ alkyl, and $X^c$ is cyano or $C_1$-$C_{12}$ alkoxycarbonyl. Specific examples of suitable comonomers for use in the rigid phase include, methyl (meth)acrylate, ethyl(meth)acrylate, n-propyl(meth)acrylate, isopropyl(meth)acrylate, and the like, and combinations comprising at least one of the foregoing comonomers.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may generally comprise up to 100 wt % of monovinyl aromatic monomer, specifically 30 to 100 wt %, more specifically 50 to 90 wt % monovinylaromatic monomer, with the balance being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise 40 to 95 wt % elastomer-modified graft copolymer and 5 to 65 wt % graft (co)polymer, based on the total weight of the impact modifier. In another embodiment, such impact modifiers comprise 50 to 85 wt %, more specifically 75 to 85 wt % rubber-modified graft copolymer, together with 15 to 50 wt %, more specifically 15 to 25 wt % graft (co)polymer, based on the total weight of the impact modifier.

Another specific type of elastomer-modified impact modifier comprises structural units derived from at least one silicone rubber monomer, a branched acrylate rubber monomer having the formula $H_2C=C(R^d)C(O)OCH_2CH_2R^e$, wherein $R_d$ is hydrogen or a $C_1$-$C_8$ linear or branched alkyl group and $R^e$ is a branched $C_3$-$C_{16}$ alkyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane., octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable, alkenyl-containing organic material may be, for example, a monomer of formula (16) or (17), e.g., styrene, alpha-methylstyrene, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl) (dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from 30° C. to 110° C. to form a silicone rubber latex, in the presence of a surfactant such as dodecylbenzenesulfonic acid. Alternatively, a cyclic siloxane such as cyclooctamethyltetrasiloxane and tetraethoxyorthosilicate may be reacted with a first graft link monomer such as (gamma-methacryloxypropyl)methyldimethoxysilane, to afford silicone rubber having an average particle size from 100 nanometers to 2 micrometers. At least one branched acrylate rubber monomer is then polymerized with the silicone rubber particles, optionally in presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from 100 nanometers to 2 micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

The foregoing types of impact modifiers, including SAN copolymers, can be prepared by an emulsion polymerization process that is free of basic materials such as alkali metal salts of $C_{6-30}$ fatty acids, for example sodium stearate, lithium stearate, sodium oleate, potassium oleate, and the like; alkali metal carbonates, amines such as dodecyl dimethyl amine, dodecyl amine, and the like; and ammonium salts of amines, if desired. Such materials are commonly used as surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof. A specific surfactant is a $C_{6-16}$, specifically a $C_{6-12}$ alkyl sulfonate. Emulsion rubbers made with alkyl aryl sulfonate surfactants are preferred over alkyl sulfate or carboxylic (fatty) acid salt surfactants for better melt stability of the resultant emulsion rubber when blended with polycarbonates.

In particular embodiments, the grafted polybutadiene rubber (B) is an acrylonitrile-butadiene-styrene (ABS) polymer. In other embodiments, the grafted polybutadiene rubber (B) is a methyl methacrylate-butadiene-styrene (MBS) polymer. Generally speaking, ABS and MBS can be considered as being made by polymerizing styrene with either acrylonitrile or methacrylate, with the polymerization occurring in the presence of polybutadiene. This results in a polybutadiene "backbone" having short chains of styrene-acrylonitrile or styrene-methyl methacrylate grafted onto the backbone. In embodiments, the grafted polybutadiene rubber contains from about 15 wt % to about 80 wt % of polybutadiene by weight of the grafted polybutadiene rubber.

The polymeric composition also comprises (C) a phosphorous-containing flame retardant. The phosphorous-containing flame retardant may be an organic phosphate and/or an organic compound containing phosphorus-nitrogen bonds. In particular embodiments, the phosphorous-containing flame retardant is an aryl phosphate having a molecular weight of from about 350 daltons to about 1000 daltons.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis (2-ethylhexyl)p-tolyl phosphate, tritolyl phosphate, bis(2-ethylhexyl)phenyl phosphate, tri(nonylphenyl)phosphate, bis (dodecyl)p-tolyl phosphate, dibutyl phenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

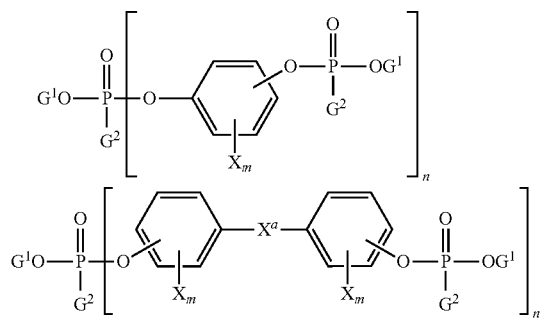

-continued

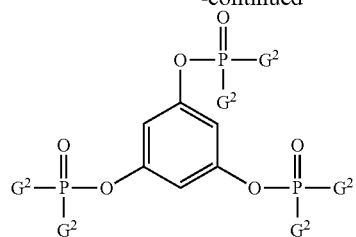

wherein each $G^1$ is independently a hydrocarbon having 1 to about 30 carbon atoms; each $G^2$ is independently a hydrocarbon or hydrocarbonoxy having 1 to about 30 carbon atoms; each $X_m$ is alkyl, aryl or hydrogen; m 0 to 4, and n is 1 to about 30. Examples of suitable di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A (BPA-DP), respectively, their oligomeric and polymeric counterparts, and the like. Methods for the preparation of the aforementioned di- or polyfunctional aromatic compounds are described in British Patent No. 2,043,083.

Desirably, the phosphorous-containing flame retardant does not contain any halogens. In particular embodiments, the phosphorous-containing flame retardant is bisphenol-A bis(diphenyl)phosphate and resorcinol tetraphenyl diphosphate (RDP).

In particular embodiments, the phosphorous-containing flame retardant is an aryl phosphate that has less than 5% triphenyl phosphate. Low levels of the more volatile triphenyl phosphate are preferred to prevent flame retardant migration during extrusion or during injection molding resulting in plate out or juicing.

The polymeric composition also comprises (D) a combination of a silicone-containing functionality and fumed silica. The combination (D) may also be described as a crosslinked silicone rubber containing silica.

The silicone-containing functionality is, in embodiments, an organopolysiloxane that comprises recurring units of monofunctional (M), difunctional (D), trifunctional (T), or tetrafunctional (Q) structure, referring to the number of oxygen atoms that the respective silicon atom is bonded to. For reference, these four structures (M, D, T, Q) are illustrated below:

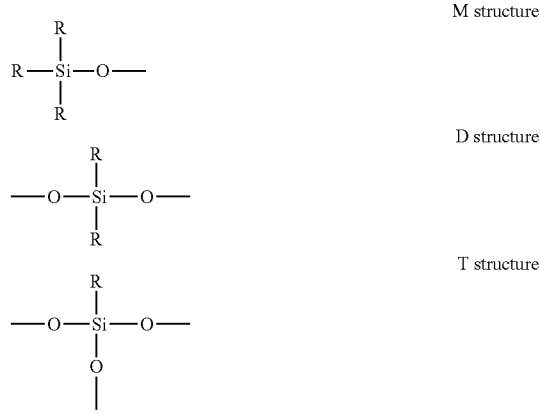

-continued

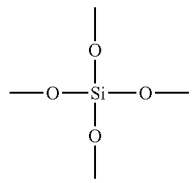

Q structure where R is independently a monovalent hydrocarbon or a vinyl unit (—CH=CH$_2$). Exemplary monovalent hydrocarbon units include alkyl radicals, particularly those having 1 to 8 carbon atoms and being linear or cyclic; and aryl radicals such as phenyl, biphenyl, and naphthyl.

In embodiments, the silicone-containing functionality comprises from about 0.1 mole % to about 10 mole % vinyl units and from about 0.1 mole % to about 20 mole % silicone linkages of T or Q structure. The percentage of vinyl units is determined by proton and silicon nuclear magnetic resonance (NMR) spectroscopy. For example, 100% vinyl units would have a vinyl unit present for each silicon atom in the precursor to the flame reactant antidrip additive. The vinyl unit may be partially or completely reacted in the crosslinking of the silicone. The percentage of silicone linkages having each structure (Q, T, D, or M) can be likewise determined by silicon NMR. For example, a resin with 50% D units would have half of the silicon atoms with two methyl substituents. The presence of Q and T structures indicates a crosslinked silicone functionality, or in other words that the silicone functionality has a high degree of branching. In embodiments, the silicone functionality/silicone rubber has an ultrahigh molecular weight, which correlates to the viscosity of the silicone rubber having a value of from 1 million to 100 million mm$^2$/sec. In embodiments, the silicone-containing functionality is a crosslinked dimethyl silicone rubber having vinyl functionality.

An inorganic silica filler, particularly fumed silica, is part of the combination (with the crosslinked silicone rubber). The silica filler may have hydrophilic properties or may have been hydrophobicized by known processes. In embodiments, the silica has a surface area of 100 to 300 square meters per gram (m$^2$/g) when measured per ASTM D1993. The silica should have a weight loss on drying at 300° C. of less than 15 wt %. The silica, in embodiments, has an aggregate particle size of from about 0.1 micrometers (μm) to about 1.0 μm and is less than 0.1% crystalline silica.

When the silicone-containing functionality and the silica are considered together as a combination, the silica is present in the amount of from about 5 wt % to about 50 wt % of the combination. In more specific embodiments, the silica is present in the amount of from about 20 wt % to about 50 wt % of the combination. The silicone-containing functionality and the silica may be presented together in a pelletized form. A suitable crosslinked silicone rubber and silica combination is commercially available as GENIOPLAST S pellets from Wacker Chemie and is described in U.S. Pat. No. 7,250,127.

In embodiments, the polymeric composition comprises from about 50 wt % to about 90 wt % of the polycarbonate (A); from about 3 wt % to about 30 wt % of the ABS/MBS or grafted butadiene rubber (B); about 5 wt % to about 16 wt % of the phosphorous-containing flame retardant (C); and from about 0.3 wt % to about 5.0 wt % of the combination of the silicone-containing functionality and fumed silica (D). These values are based on the total weight of the composition.

In more specific embodiments, the polymeric composition comprises from 70 wt % to 90 wt % of the polycarbonate (A); from 3 wt % to 7 wt % of the ABS/MBS or grafted butadiene rubber (B); from 8 wt % to 9 wt % of the phosphorous-containing flame retardant (C); and from 0.3 wt % to 3 wt % of the crosslinked silicone rubber and silica (D).

The polymeric compositions of the present disclosure have a combination of good flame retardance and good mechanical properties. The composition may have a melt volume rate (MVR) of at least 15 cc/10 minutes when measured at 260° C. and 2.16 kg per ASTM D1238; a notched Izod impact strength of 480 J/m or greater when measured per ASTM D256, a heat distortion temperature at 1.82 MPa of 75° C. or greater when measured per ASTM D648; a change in melt viscosity when held at 260° C. for 30 minutes of less than 15% from the initial melt viscosity, when measured per ASTM D4440; a multiaxial impact energy at maximum load of over 50 joules at 23° C. and at 0° C. when measured per ASTM D3763; a tensile modulus of 3200 MPa or greater when measured per ASTM D638; a tensile strength at yield of 45 MPa or greater when measured per ASTM D638; greater than 100% elongation at break when measured per ASTM 0638; and/or an injection molding spiral flow at 0.09 inch thickness at 260° C. of more than 15.0 inches. The composition may have any combination of these properties. An article molded from the composition can also attain UL-94 V-1 performance at a thickness of 2.0 mm. In addition, the composition has a low halogen content of less than 500 ppm, including less than 100 ppm halogen content or less than 50 ppm halogen content. Halogens include fluorine, chlorine, bromine, and iodine. In particular, the composition has less than 50 ppm of a polytetrafluoroethylene. Please note that some of the properties (e.g. notched Izod) are measured using articles made from the polymeric composition; however, such properties are described as belonging to the polymeric composition for ease of reference.

The polymeric composition has a notched Izod impact strength of 480 J/m or greater when measured per ASTM D256. In further embodiments, the notched Izod impact strength is 520 J/m or greater, including 540 J/m or greater.

The polymeric composition has a tensile strength at yield of 45 MPa or greater when measured per ASTM D638. In further embodiments, the tensile strength at yield is 50 MPa or greater.

The polymeric composition has greater than 100% elongation at break when measured per ASTM 0638. In further embodiments, the composition has 115% or greater elongation at break.

In some embodiments, the polymeric composition has a melt volume rate (MVR) of at least 15 cc/10 minutes when measured at 260° C. and 2.16 kg per ASTM D1238; UL-94 V-1 performance at a thickness of 2.0 mm; and a change in melt viscosity when held at 260° C. for 30 minutes of less than 15% from the initial melt viscosity, when measured per ASTM D4440.

In more specific embodiments, the polymeric composition has a melt volume rate (MVR) of at least 15 cc/10 minutes when measured at 260° C. and 2.16 kg per ASTM D1238; UL-94 V-1 performance at a thickness of 2.0 mm; a change in melt viscosity when held at 260° C. for 30 minutes of less than 15% from the initial melt viscosity, when measured per ASTM D4440; a notched Izod impact strength of 480 J/m or greater when measured per ASTM D256; and a heat distortion temperature at 1.82 MPa of 75° C. or greater when measured per ASTM D648.

In other embodiments, the polymeric composition has a melt volume rate (MVR) of at least 15 cc/10 minutes when measured at 260° C. and 2.16 kg per ASTM D1238; a notched Izod impact strength of 480 J/m or greater when measured per ASTM D256, and a heat distortion temperature at 1.82 MPa of 75° C. or greater when measured per ASTM D648.

In more specific embodiments, the polymeric composition has a melt volume rate (MVR) of at least 15 cc/10 minutes when measured at 260° C. and 2.16 kg per ASTM D1238; a notched Izod impact strength of 480 J/m or greater when measured per ASTM D256, and a heat distortion temperature at 1.82 MPa of 75° C. or greater when measured per ASTM D648; a multiaxial impact energy at maximum load of over 50 joules at 23° C. and at 0° C. when measured per ASTM D3763; a tensile modulus of 3200 MPa or greater when measured per ASTM 0638, a tensile strength at yield of 45 MPa or greater when measured per ASTM D638, and greater than 100% elongation at break when measured per ASTM D638.

In particular, it should be noted that the polymeric composition has a notched Izod impact strength of 480 J/m or greater when measured per ASTM D256. This relatively high value means that the composition can have a lower content of the grafted butadiene rubber, which further increases the flame retardance properties as the butadiene rubber is a relatively good fuel. In embodiments, the polymer composition has less than 9 wt % of the grafted butadiene rubber (B), including from 3 wt % to 7 wt %, as previously discussed.

The polymeric composition generally does not contain any toxic ingredients. In embodiments, the composition has less than 50 ppm of antimony, lead, cadmium, mercury, arsenic, thallium, or mixtures thereof.

The polymeric composition may further comprise an ungrafted rigid copolymer (E) in addition to the grafted butadiene rubber (B). The ungrafted copolymer (E) may be present in the composition in an amount of from about 1 to about 15 wt % of the composition, including from 6 wt % to 7 wt %.

The ungrafted copolymer (E) may be the same as any of the rigid copolymers described above, without the elastomer modification. The rigid copolymers generally have a Tg greater than about 15° C., specifically greater than about 20° C., and include, for example, polymers derived from monovinylaromatic monomers containing condensed aromatic ring structures, such as vinyl naphthalene, vinyl anthracene and the like, or monomers such as styrene and alpha-methyl styrene; monovinylic monomers such as itaconic acid, acrylamide, N-substituted acrylamide or methacrylamide, maleic anhydride, maleimide, N-alkyl, aryl or haloaryl substituted maleimide, glycidyl(meth)acrylates, and monomers such as acrylonitrile, methyl acrylate and methyl methacrylate; and copolymers of the foregoing, for example styrene-acrylonitrile (SAN), styrene-alpha-methyl styrene-acrylonitrile, methyl methacrylate-acrylonitrile-styrene, and methyl methacrylate-styrene.

The rigid copolymer may comprise about 1 to about 99 wt %, specifically about 20 to about 95 wt %, more specifically about 40 to about 90 wt % of vinylaromatic monomer, together with 1 to about 99 wt %, specifically about 5 to about 80 wt %, more specifically about 10 to about 60 wt % of copolymerizable monovinylic monomers. In embodiments, the rigid copolymer is styrene-acrylonitrile (SAN), which may comprise about 50 to about 99 wt % styrene, with the balance acrylonitrile, specifically about 60 to about 90 wt % styrene, and more specifically about 65 to about 85 wt % styrene, with the remainder acrylonitrile. This non-rubber grafted SAN may have a weight average molecular weight of from about 70,000 daltons to about 170,000 daltons. In specific embodiments, the SAN copolymer is present in an amount of 6 wt % to 7 wt % of the polymeric composition.

The rigid copolymer may be manufactured by bulk, suspension, or emulsion polymerization, and is substantially free of impurities, residual acids, residual bases or residual metals that may catalyze the hydrolysis of polycarbonate. In one embodiment, the rigid copolymer is manufactured by bulk polymerization using a boiling reactor. The rigid copolymer may have a weight average molecular weight of about 50,000 to about 300,000 when measured by GPC using polystyrene standards. In one embodiment, the weight average molecular weight of the rigid copolymer is about 70,000 to about 190,000.

The polymeric composition may further comprise a mineral filler (F) which comprises talc or kaolin clay or is a mixture thereof. The talc may be fibrous, modular, needle shaped, or lamellar talc. The kaolin clay may be hard, soft, or calcined, and may comprise various coatings known in the art to facilitate compatibility with polymeric resins. The mineral filler generally has a particle size of less than 10 microns and has a weight loss at 300° C. of less than 5 wt %. The mineral filler (F) is present in an amount of from about 1 wt % to about 30 wt % of the polymeric composition, or in more specific embodiments from 1 wt % to 5 wt %. For improved impact strength, talc or clay with an average particle size of about 1 micron and a topsize (largest particle size) of below 10 microns is preferred. In other instances, a topsize of less than about 6 microns is desirable. In particular embodiments, when the mineral filler (F) is present, the weight ratio of the mineral filler (F) to the crosslinked silicone rubber and silica (D) is from about 1 to about 5, and desirably is from 2 to 3.

The polymeric composition may also include various additives such as fillers, reinforcing agents, stabilizers, colorants, and the like, with the proviso that the additives do not adversely affect the desired properties of the thermoplastic compositions. Mixtures of additives may be used. Such additives may be mixed at a suitable time during the mixing of the components for forming the polymeric composition.

Examples of other suitable fillers or reinforcing agents include any materials known for these uses. For example, suitable fillers and reinforcing agents include silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); wollastonite; surface-treated wollastonite; single crystal fibers or "whiskers" such as silicon carbide, alumina, boron carbide, iron, nickel, copper, or the like; fibers (including continuous and chopped fibers) such as carbon fibers, glass fibers, such as E glass, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; reinforcing organic fibrous fillers formed from organic polymers capable of forming fibers such as poly(ether ketone), polyimide, polybenzoxazole, poly (phenylene sulfide), aromatic polyamides, aromatic polyimides, polyetherimides, or the like; as well as additional fillers and reinforcing agents such as mica, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of about zero to about 50 parts by weight, based on 100 parts by weight of the polymeric components of the polymeric composition.

The thermoplastic composition may comprise a primary antioxidant or "stabilizer" (e.g., a hindered phenol and/or secondary aryl amine) and, optionally, a secondary antioxidant (e.g., a phosphate and/or thioester). Suitable antioxidant additives include, for example, organophosphites such as tris (nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 to about 1 parts by weight, optionally about 0.05 to about 0.5 parts by weight, based on 100 parts by weight of the polymeric components of the polymeric composition.

Suitable heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of about 0.01 to about 5 parts by weight, optionally about 0.05 to about 0.3 parts by weight, based on 100 parts by weight of the polymeric components of the polymeric composition.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of about 0.01 to about 10 parts by weight, optionally about 0.1 to about 1 parts by weight, based on 100 parts by weight of the polymeric components of the polymeric composition.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy] methyl]propane (UVINUL™ 3030); 2,2'-(1,4-phenylene) bis (4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 0.1 to about 5 parts by weight, based on 100 parts by weight of the polymeric components of the polymeric composition.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. When present, such materials can be used in amounts of 0.001 to 1 percent by weight, specifically 0.01 to 0.75 percent by weight, more specifically 0.1 to 0.5 percent by weight of the polymeric components of the polymeric composition. A preferred mold release is penta erythritol tetra stearate (PETS).

In particular embodiments, the polymeric composition includes from about 0.001 wt % to about 0.3 wt % of a stabilizer selected from the group consisting of phosphites, phosphonites, hindered phenols, and mixtures thereof.

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.01 to about 10 parts by weight, based on 100 parts by weight of the polymeric components of the polymeric composition.

In particular embodiments, the polymeric composition may further comprise titanium dioxide ($TiO_2$) (G). The $TiO_2$ desirably has a small particle size of less than 5 microns. The $TiO_2$ is also encapsulated in a silica-alumina coating using methods known in the art.

The $TiO_2$ may also be passivated. In this regard, the use of passivated $TiO_2$ can contribute to the balance of properties desired for various applications by providing a polycarbonate composition with improved melt stability, while still maintaining the unique combination of the above noted physical properties. While not being restricted by any mechanism, it is thought that the passivation agent chemically reacts with sites in the $TiO_2$ to render them inert to reactions that would cause degradation of the polycarbonate.

The passivation agent is selected for compatibility with resin components, particularly the polycarbonate, and its ability to deactivate any active sites on the $TiO_2$ particle surface that may contribute to resin decomposition. The type and amount of passivating agent is further selected so as to not significantly adversely affect the optical properties and the CTE of the filled polycarbonate composition.

In one embodiment, the passivation agent is a silane, i.e., a compound having a silicon-hydrogen bond. Suitable passivation agents include, for example silane compounds of the general Formulas (18) or (19):

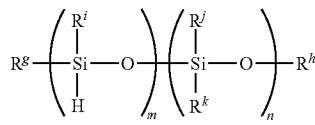
(18)

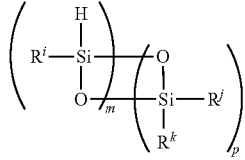
(19)

wherein m is greater than or equal to 1; the sum of m and n is equal to 1 to about 10,000; m+p is 3 to about 1000; $R^g$ and $R^i$ are each independently hydrogen, alkyl, aryl, alkylaryl, alkoxy and aryloxy; $R^j$ and $R^k$ are each independently alkyl, aryl, alkylaryl, alkoxy, and aryloxy; and $R^h$ is trialkylsilyl, arylalkylsilyl, triarylsilyl, hydrogen, alkyl, aryl, or alkylaryl.

In some instances of Formula (18), $R^g$ and $R^i$ may each independently be hydrogen, methyl, ethyl, propyl, phenyl, ethylphenyl, methoxy, ethoxy, and phenoxy; and $R^k$ are each independently methyl, ethyl, propyl, phenyl, ethylphenyl, methoxy, ethoxy, and phenoxy; and $R^h$ is hydrogen, methyl, ethyl, propyl, phenyl, or ethylphenyl. In some instances of Formula (19), $R^i$ may be hydrogen, methyl, ethyl, propyl, phenyl, or ethylphenyl; and $R^j$ and $R^k$ are each independently methyl, ethyl, propyl, phenyl, ethylphenyl, methoxy, ethoxy, and phenoxy.

Mixtures of passivation agents may also be used. A suitable passivation agent is a silicone fluid available under the trade name DF1040 from GE Silicones, which is a trimethyl silyl-capped methyl hydrogen silicone of Formula (18) wherein $R^g$ and $R^i$ are methyl, $R^h$ is a trimethyl silyl, n=0 and m=about 16.

It has been found that careful adjustment of the molecular weight and amount of silicon hydride passivating agents such as those described by Formulas (18) and (19) results in compositions with both improved melt stability and excellent optical and physical properties. If too much of the passivating agent is used with too high a molecular weight, it may increase melt stability but also increase haze. In contrast, by excessively lowering the molecular weight of the passivating agent, the passivating agent can become too volatile and will escape the machinery during standard processing temperatures, for example 300° C. In one embodiment, the type, amount, and molecular weight of the passivating agent is selected to provide compositions with a percent haze of below about 20% and a glass transition temperature (Tg) of greater than about 120° C. Still further, the type, amount, and molecular weight of the passivating agent may be selected so as to maintain the desired color of the polymeric composition, i.e., to shift the color of the composition by less than about 10 delta E units, specifically less than 5 delta E units.

To achieve these results, the silane compound generally has a molecular weight of about 100 to about 10,000, specifically about 200 to about 5000 and more specifically about 200 to about 1000 absolute molecular weight. In one possible embodiment, compounds of Formulas (18) and (19) wherein m+n=3 to about 100 and m+p=3 to about 50 may be desired to provide less volatility but still be of low enough molecular weight to retain good optical properties. The silane compound may be used in an amount of 0.1 to 10 wt% of the $TiO_2$.

In specific embodiments, the passivation agent is a silicon compound selected from the group consisting of hydrogen silanes, $C_1$ to $C_3$ mono-alkoxy silanes, $C_1$ to $C_3$ di-alkoxy silanes, $C_1$ to $C_3$ tri-alkoxy silanes, and mixtures thereof.

In more specific embodiments, the $TiO_2$ is encapsulated in a silica-alumina coating, has a particle size of less than 5 microns, and has been passivated by treatment with a silicon compound selected from the group consisting of hydrogen silanes, $C_1$ to $C_3$ mono-alkoxy silanes, $C_1$ to $C_3$ di-alkoxy silanes, and $C_1$ to $C_3$ tri-alkoxy silanes.

In particular embodiments, the polymeric composition comprises a polycarbonate polymer, a high rubber grafted acrylonitrile-butadiene-styrene polymer, an aryl phosphate, ungrafted linear SAN, and a combination of dimethyl silicone with fumed silica. The relative amounts of these ingredients have been previously discussed.

The following examples are provided to illustrate the compositions and methods of the present disclosure. The examples are merely illustrative and are not intended to limit devices made in accordance with the disclosure to the materials, conditions, or process parameters set forth therein.

EXAMPLES

Blends were prepared by first tumble blending and then extruding mixtures of polycarbonate (PC) resin with a SAN grafted butadiene rubber (HRG-ABS), a high Mw aryl phosphate (RDP), linear SAN, colorants, stabilizers and polyester release agent, or other ingredients mentioned in the tables, with a pelletized high viscosity dimethyl silicone/inorganic fumed silica anti drip agent, in a 30 mm co-rotating vacuum vented, twin screw extruder at 300 to 400 rpm with a temperature from 240 to 300° C. The aryl phosphate was pumped into the extruder downstream from the vacuum vent. Compositions are listed in parts per hundred (phr) except where noted otherwise. The extrudate was cooled in a water bath pelletized and dried at 115° C. Test samples were injection molded at a set temperature of 240 to 270° C. and a mold temperature of 70° C. to 90° C. using a 30 second cycle time. All molded samples were conditioned for at least 48 hours at 50% relative humidity prior to testing. Properties were measured using ASTM test methods as listed below.

Multiaxial impact testing (MAI) is based on the ASTM method D3763. This procedure provides information on how a material behaves under multiaxial deformation conditions. The deformation applied is a high-speed puncture. An example of a supplier of this type of testing equipment is Dynatup. Properties reported include maximum energy absorbed, which is expressed in Joules (J) and ductility of parts in percent (% D) based on whether the part fractured in a brittle or ductile manner. A ductile part showed yielding where it was penetrated by the crosshead, a brittle part split into pieces, or had a section punched out that showed no yielding. The reported test result is calculated as the average of ten test plaques for injection-molded parts.

Notched Izod impact (NII) strength was measured on 3.2 mm bars using a 5 lb hammer at 23° C. as per ASTM D256.

Flexural modulus was measured on 127 mm×12.7 mm×3.2 mm bars using ASTM method D 790. Flexural strength is reported at yield.

Tensile strength was measured on 3.2 mm tensile bars with a 50 mm/min crosshead speed using ASTM method D638. Tensile strength is reported at yield (Y), and percent elongation is reported at break (B).

The heat distortion temperature under load (HDT) was measured on 127 mm×3.2 mm bars using ASTM method D648 with a 1.82 MPa (264 psi) load. Parts were not annealed before testing.

Melt volume rate (MVR) was measured as per ASTM method D1238 at 260° C. with a 2.16 Kg load on samples dried for 2 to 3 hours at 110° C. A 6 minute equilibration was used before data was collected. MVR is reported in cubic centimeters (cc) of polymer melt/10 minutes.

Spiral Flow: The blends were injection molded under the same conditions, with a 500° F./260° C. set temperature, a 150° F./65° C. mold temperature, and using a channel depth of 0.09 inches. At least 10 samples were molded to allow the machine to equilibrate. Spiral flow was measured in inches, and was the average of at least 5 samples run after the machine was equilibrated.

The melt stability (melt dwell) of the blend samples was evaluated using a parallel plate rheometer as per ASTM D4440. The sample was dried for at least 2 hours at 110° C. and loaded into the rheometer. The sample was allowed to equilibrate for 6 minutes at 260° C. and held under this condition for 30 minutes (1800 seconds) under nitrogen. The change (increase or decrease) in viscosity was measured as a percent of the initial viscosity value versus the final (30 minute) viscosity value.

Flammability tests were performed following the procedure of Underwriter's Laboratory Bulletin 94 entitled "Tests for Flammability of Plastic Materials, UL94." According to this procedure, materials may be classified as V-0, V-1 or V-2 on the basis of the test results obtained for samples of 1.5 to 2.0 millimeter thickness. The samples are made according to the UL94 test procedure using standard ASTM molding criteria. Samples were burned in a vertical orientation after aging for 48 hours at 23° C., 50% relative humidity or 168 hours at 70° C. At least 10 injection molded bars were burned for each UL test. The criteria for each of the flammability classifications tested are described below.

V0: In a sample placed so that its long axis is 180 degrees to the flame, the average period of flaming and/or smoldering after removing the igniting flame does not exceed five seconds and none of the vertically placed samples produces drips of burning particles that ignite absorbent cotton, and no specimen burns up to the holding clamp after flame or after glow. Five bars flame out time (FOT) is the sum of the flame out time for five bars each lit twice for ten (10) seconds each, for a maximum flame out time of 50 seconds. FOT1 is the average flame out time after the first light. FOT2 is the average flame out time after the second light.

V-1, V-2: In a sample placed so that its long axis is 180 degrees to the flame, the average period of flaming and/or smoldering after removing the igniting flame does not exceed twenty-five seconds and, for a V-1 rating, none of the vertically placed samples produces drips of burning particles that ignite absorbent cotton. The V2 standard is the same as V-1, except that flaming drips that ignite the cotton are permitted. Five bar flame out time (FOT) is the sum of the flame out time for five bars, each lit twice for ten (10) seconds each, for a maximum flame out time of 250 seconds.

The data was also analyzed by calculating the average flame out time, standard deviation of the flame out time and the total number of drips, and by using statistical methods to convert that data to a prediction of the probability of first time pass, or "p(FTP)", that a particular sample formulation would achieve a "pass" rating in the conventional UL94 V0 or V1 testing of 5 bars. The probability of a first time pass on a first submission (pFTP) may be determined according to the formula:

$$\text{PFTP}=(P_{t1>mbt,\ n=0} \times P_{t2>mbt,\ n=0} \times P_{total<=mbt} \times P_{drip,\ n=0})$$

where $P_{t1>mbt,\ n=0}$ is the probability that no first burn time exceeds a maximum burn time value, $P_{t2>mbt,\ n=0}$ is the probability that no second burn time exceeds a maximum burn time value, $P_{total<=mbt}$ is the probability that the sum of the burn times is less than or equal to a maximum total burn time value, and $P_{drip,\ n=0}$ is the probability that no specimen exhibits dripping during the flame test. First and second burn time refer to burn times after a first and second application of the flame, respectively.

The probability that no first burn time exceeds a maximum burn time value, $P_{t1>mbt,\ n=0}$, may be determined from the formula: $P_{t1>mbt,\ n=0}=(1-P_{t1>mbt})^5$ where $P_{t1>mbt}$ is the area under the log normal distribution curve for t1>mbt, and where the exponent "5" relates to the number of bars tested. The probability that no second burn time exceeds a maximum burn time value may be determined from the formula: $P_{t2>mbt,\ n=0}=(1-P_{t2>mbt})$ where $P_{t2>mbt}$ is the area under the normal distribution curve for t2>mbt. As above, the mean and standard deviation of the burn time data set are used to calculate the normal distribution curve. For the UL-94 V-0 rating, the maximum burn time is 10 seconds. For a V-1 or V-2 rating the maximum burn time is 30 seconds. The probability $P_{drip,\ n=0}$ that no specimen exhibits dripping during the flame test is an attribute function, estimated by: $(1-P_{drip})^5$ where $P_{drip}$=(the number of bars that drip/the number of bars tested).

The probability $P_{total<=mbt}$ that the sum of the burn times is less than or equal to a maximum total burn time value may be determined from a normal distribution curve of simulated 5-bar total burn times. The distribution may be generated from a Monte Carlo simulation of 1000 sets of five bars using the distribution for the burn time data determined above.

Techniques for Monte Carlo simulation are well known in the art. A normal distribution curve for 5-bar total burn times may be generated using the mean and standard deviation of the simulated 1000 sets. Therefore, $P_{total<=mtbt}$ may be determined from the area under a log normal distribution curve of a set of 1000 Monte Carlo simulated 5-bar total burn time for total<=maximum total burn time. For the UL-94 V-0 rating, the maximum total burn time is 50 seconds. For a V-1 or V-2 rating, the maximum total burn time is 250 seconds.

Preferably, p(FTP) is as close to 1 as possible, for example, greater than or equal to about 0.6, or greater than or equal to about 0.7, or greater than or equal to about 0.8 or, more specifically, greater than or equal to about 0.85, for maximum flame-retardant performance in UL testing. The p(FTP)>0.7, and specifically, p(FTP)>0.85, is a more stringent standard than merely specifying compliance with the referenced V-0 or V-1 test.

Note that letters designate comparative examples while numbers designate examples of the present disclosure.

Materials

Table 1 summarizes various raw materials used in the examples. Table 1 also provides an exemplary, non-limiting range of weight percentages at which each material can be employed.

TABLE 1

Raw Materials

| Raw Material | Description | Amount (wt%) |
|---|---|---|
| HRG-ABS | Blendex 360 SAN graft poly butadiene, ~50% polybutadiene, mean particle size ~250 microns | 3-30% |
| RDP | Resorcinol Diphosphate (Mw ~576, with less than 100 ppm triphenyl phosphate) | 5-16% |
| HF-PC | bisphenol-A polycarbonate polymer, Mw ~21,900 | 50-90% |
| PC-100 | bisphenol-A polycarbonate polymer, Mw ~29,900 | 50-90% |
| SAN | Poly(styrene acrylonitrile) copolymer, Mw ~120,000 | 0-15% |
| PETS | Pentaerythritol Tetrastearate mold release/process aid | 0-0.5% |
| Hindered Phenol | octadecyl-3-(3,5-di-tert-butyl-4-hydroxyphenyl)-propionate (IRGANOX 1076 from Ciba) | 0-0.5% |
| Aryl Phosphite | tris di-t-butyl phenyl phosphite/stabilizer (IRGAPHOS 168 from Ciba) | 0 0.5% |
| TiO2 | silica alumina encapsulated TiO2 passivated with a silicone hydrogen fluid | 0-10% |
| CB | Carbon Black, Monarch 800 | 0-0.5% |
| Silicone/Silica | pellet of partially x-linked vinyl silicone with 35% fumed silica (GENIOPLAST S from Wacker Silicones) | 0.3-5% |
| Talc | Talc (Luzenac Jetfine 3CA), ~1 micron avg. particle size and ~6 micron topsize | 0-30% |

Table 2 shows the ingredients used in Comparative Example A and Examples 1-4. Generally, the compositions included were made from a complex blends of a high and low Mw polycarbonate (PC) with a high rubber graft ABS, linear SAN, resorcinol diphosphate (RDP) with low triphenyl phosphate content, PETS mold release agent, and a stabilizer combination of tri-aryl phosphite and hindered phenol ester with a color package comprising carbon black and a small particle size silica-alumina encapsulated, hydrogen silane passivated, titanium dioxide ($TiO_2$).

TABLE 2

| Ingredient | Units | Comparative Example A | Example 1 | Example 2 | Example 3 | Example 4 |
|---|---|---|---|---|---|---|
| HF-PC | | 27.32 | 27.32 | 27.32 | 27.32 | 27.32 |
| PC-100 | | 42.73 | 42.73 | 42.73 | 42.73 | 42.73 |
| HRG-ABS | phr | 9.0 | 9.0 | 9.0 | 9.0 | 9.0 |
| SAN | phr | 8.3 | 8.3 | 8.3 | 8.3 | 8.3 |
| RDP | phr | 11.5 | 11.5 | 11.5 | 11.5 | 11.5 |
| PETS | phr | 0.5 | 0.5 | 0.5 | 0.5 | 0.5 |
| Hindered Phenol | phr | 0.15 | 0.15 | 0.15 | 0.15 | 0.15 |
| Aryl Phosphite | phr | 0.1 | 0.1 | 0.1 | 0.1 | 0.1 |
| Carbon Black | phr | 0.25 | 0.25 | 0.25 | 0.25 | 0.25 |
| TiO2 | phr | 2.0 | 2.0 | 2.0 | 2.0 | 2.0 |
| Silicone/Silica | phr | none | 0.5 | 1.0 | 2.0 | 3.0 |
| UL-94 | | 1.5 mm, 23° C., 48 hours 20 bars tested | | | | |
| UL-94 1.5 mm | | V-2 | V-2 | V-2 | V-1 | V-1 |
| Bars w. Flaming Drips | | 20/20 | 17/20 | 11/20 | 2/20 | 2/20 |
| FOT 1 avg. | sec | 9.0 | 7.0 | 1.9 | 8.4 | 8.4 |
| FOT 2 avg. | sec | 2.4 | 11.9 | 11.0 | 24.4 | 21.1 |
| Total avg. FOT | sec | 11.4 | 18.9 | 12.9 | 32.8 | 29.5 |
| UL94 | | 1.5 mm, 70° C., 168 hours 20 bars tested | | | | |
| UL-94 1.5 mm | | V-2 | V-2 | V-2 | V-1 | V-1 |
| Bars w. Flaming Drips | | 19/20 | 6/20 | 5/20 | 0/20 | 1/20 |
| FOT 1 avg. | sec | 10.5 | 2.4 | 1.0 | 2.4 | 4.7 |
| FOT 2 avg. | sec | 5.3 | 16.5 | 16.0 | 21.2 | 22.2 |
| Total avg. FOT | sec | 15.8 | 18.9 | 17.0 | 23.6 | 26.9 |
| Rheological Properties | | | | | | |
| MVR 260° C. 2.16 Kg | cc/10 min | 17.9 | 17.5 | 18.3 | 17.3 | 16.7 |
| Spiral Flow 0.090 in. Length | inches | 500 F. melt, 150 F. mold | | | | |
| | | 16.5 | 16.0 | 15.5 | 16.5 | 16.0 |
| Melt Dwell Viscosity Change | % | 260° C. for 1800 seconds | | | | |
| | | −0.9% | −1.1% | −1.1% | −0.9% | −0.7% |

Comparative Example A, even with a high level of polycarbonate, high phosphate content and the high surface area $TiO_2$, had very poor flame resistance, showing a high degree of dripping when ignited, giving only a V-2 rating in the UL-94 test. Often this type of problem would be fixed by addition of a fluoro polymer such as a fibular PTFE as described, for example, in U.S. Pat. No. 5,804,654. Increasingly, this type of product is less desirable since it contains the halogen fluorine thought by some to be a problem in terms of its ultimate environmental fate. However, the prevention of dripping during burning without fluoropolymers is very difficult and is often is achieved by going to high Mw, stiff polymers that will not flow to fill thin walled molded parts.

Surprisingly, we have found that addition of a minor amount of a high viscosity dimethylsilicone combined with a high surface area inorganic fumed silica (silicone/silica) will retard dripping while still retaining flow and melt processability. As can be seen in Examples 1 to 4, by adding 0.5 to 3.0 phr of the silicone/silica material the resulting compositions all showed much less dripping when burned compared to Comparative Example A. With 2.0 to 3.0 phr of the high viscosity dimethyl silicone/inorganic silica, Examples 3 and 4 passed the UL-94 V-1 test at 1.5 mm after conditioning at both 50% RH for 48 hours at 23° C. or heating at 70° C. for 168 hours. In addition, the resins still showed high flow with a melt volume rate (MVR) of greater than 15 cc/10 min at 260° C. The blends further showed good thin wall mold filling capability with an injection molding spiral flow at 0.09 inch thickness at 500° F./260° C. of more than 15.0 inches.

Often FR additives can have an adverse effect on polycarbonate stability by chemically attacking the polycarbonate, causing loss of molecular weight, generation of gas, and poor melt stability. Examples 1 to 4 show excellent melt stability with less than a 2% change in initial melt viscosity when held in the melt at 260° C. for 30 minutes. The parts also injection molded with no surface imperfections (splay) and no yellowing or degradation.

Table 3 shows the mechanical properties of the compositions.

TABLE 3

| Property | Units | Comparative Example A | Example 1 | Example 2 | Example 3 | Example 4 |
|---|---|---|---|---|---|---|
| Notched Izod | J/m | 428 | 485 | 519 | 543 | 541 |
| MAI 23° C. | J | 51 | 55 | 53 | 52 | 51 |
| MAI 0° C. | J | 58.3 | 52.9 | 55.0 | 50.3 | 52.8 |
| HDT 1.82 MPa | ° C. | 78 | 78 | 78 | 77 | 76 |
| Tensile Modulus | MPa | 3280 | 3260 | 3280 | 3370 | 3220 |
| Tensile Strength at Yield | MPa | 58.0 | 53.8 | 52.7 | 51.2 | 49.5 |
| % Elongation at Break | % | 107 | 132 | 121 | 119 | 115 |

Improved flame retardance is generally not useful if the composition also has excessive loss of mechanical properties that are needed for end use applications. As seen in Table 3, Examples 1 to 4 showed a notched Izod impact (NII) strength (>480 J/m) which was improved over Comparative Example A. The improvement in Izod impact allows blends with less HRG-ABS rubber content. The reduced HRG-ABS rubber content increases flame retardance because the polybutadiene rubber is a relatively good fuel due to its high hydrogen to carbon ratio. Having the same NII strength with less rubber content should allow better FR performance.

Multiaxial impact (MAI) energy at max load at 23° C. and 0° C. was still over 50 J with 100% ductile failure. HDT is also maintained over 75° C./167° F. Compositions retained a tensile modulus above 3200 MPa, tensile strength at yield greater than 45 MPa with over 100% elongation at break. Thus the improved flame resistance of the present compositions is achieved without significant loss of important mechanical properties.

Table 4 shows the ingredients and resulting properties of Examples 5-8. Generally, these non-fluorine-containing flame retardant compositions also contained mineral filler.

TABLE 4

Compositions with Mineral Filler

| Ingredient | Units | Example 5 | Example 6 | Example 7 | Example 8 |
|---|---|---|---|---|---|
| HF-PC | | 27.32 | 27.32 | 27.32 | 27.32 |
| PC-100 | | 42.73 | 42.73 | 42.73 | 42.73 |
| HRG-ABS | phr | 7.0 | 9.0 | 9.0 | 9.0 |
| SAN | phr | 8.3 | 8.3 | 8.3 | 8.3 |
| RDP | phr | 11.5 | 11.5 | 11.5 | 11.5 |
| PETS | phr | 0.5 | 0.5 | 0.5 | 0.5 |
| Hindered Phenol | phr | 0.15 | 0.15 | 0.15 | 0.15 |
| Aryl Phosphite | phr | 0.1 | 0.1 | 0.1 | 0.1 |
| Talc | phr | 2.5 | 5.0 | 2.5 | 5.0 |
| Silicone/Silica | phr | 2.00 | 1.25 | 2.00 | 2.00 |
| UL-94 2.0 mm, 23° C., 48 hours | | V-1 | V-1 | V-1 | V-0 |
| p(FTP) V-1 | | 0.98 | 0.89 | 0.99 | 0.99 |
| p(FTP) V-0 | | | 0.08 | 0.22 | 0.61 |
| UL-94 2.0 mm, 70° C., 168 hours | | V-0 | V-1 | V-0 | V-0 |
| p(FTP) V-1 | | 0.99 | 0.96 | 0.99 | 1.00 |
| p(FTP) V-0 | | 0.80 | 0.05 | 0.55 | 0.97 |
| MVR 260° C., 2.16 Kg | cc/10 min | 18.2 | 15.4 | 17.1 | 15.6 |
| HDT 1.82 MPa | ° C. | 78 | 77 | 77 | 78 |
| Flexural Modulus | MPa | 2900 | 3320 | 3050 | 3270 |

Each of Examples 5-8, having 2.5 to 5.0 phr talc and from 1.25 to 2.00 phr of the high viscosity dimethyl silicone/inorganic silica combination, show V-1 or V-0 UL-94 performance at 2.0 mm. thickness. Comparing Examples 5 and 7, which differed only in the amount of the HRG-ABS rubber, note that Example 7, which contained 2.0 phr more HRG-ABS, the p(FTP) V-0 was much lower (0.55). Example 8 provided the best results, with V-0 at 2.0 mm under both UL-94 conditioning regimes, as evidenced by both p(FTP) V-0 being above 0.6. The compositions all had a HDT above 75° C. and a high melt flow at 260° C. with a MVR above 15.0 cc/10 min. The parts all molded with a uniform surface free of splay or surface imperfections.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A flame-retardant polycarbonate blend comprising:
   from about 50 wt % to about 90 wt % of a polycarbonate polymer;
   from about 3 wt % to less than 9 wt % of a grafted butadiene rubber;
   from about 5 wt % to about 16 wt % of a phosphorus-containing flame retardant;
   from about 1 wt % to about 15 wt % of an ungrafted rigid copolymer; and
   from about 0.3 wt % to about 5 wt % of a crosslinked silicone rubber containing silica;
   wherein the blend contains less than 500 ppm halogen content, has a melt volume rate of at least 15 cc/10 min at 260° C./2.16 Kg when measured per ASTM D1238, has a notched Izod impact strength of 480 J/m or greater when measured per ASTM D256, and has a heat distortion temperature of 75° C. or greater at 1.82 MPa when measured per ASTM D648.

2. The polycarbonate blend of claim 1, wherein the grafted butadiene rubber is acrylonitrile-butadiene-styrene (ABS), methacrylate-butadiene-styrene (MBS), or a mixture thereof.

3. The polycarbonate blend of claim 1, wherein the silica is from 5 wt % to 50 wt % of the weight of the crosslinked silicone rubber and the silica.

4. The polycarbonate blend of claim 1, wherein the ungrafted rigid copolymer is a styrene-acrylonitrile (SAN) copolymer which is present in the amount of 6 wt % to 7 wt %.

5. The polycarbonate blend of claim 1, further comprising from 0.001 wt % to 0.3 wt % of a stabilizer.

6. The polycarbonate blend of claim 1, further comprising from 1 wt % to 5 wt % of a mineral filler selected from the group consisting of talc and kaolin clay.

7. The polycarbonate blend of claim 1, wherein the blend has a multiaxial impact energy at maximum load of over 50 Joules at 23° C. and at 0° C. when measured per ASTM D3763, a tensile modulus of 3200 MPa or greater when measured per ASTM D638, a tensile strength at yield of 45 MPa or greater when measured per ASTM D638, and greater than 100% elongation at break when measured per ASTM D638.

8. The polycarbonate blend of claim 1, comprising:
から 70 wt % to 90 wt % of the polycarbonate polymer;
from 3 wt % to 7 wt % of the grafted butadiene rubber;
from 8 wt % to 9 wt % of the phosphorus-containing flame retardant; and
from 0.3 wt % to 3 wt % of the crosslinked silicone rubber containing silica.

9. The polycarbonate blend of claim 1, containing less than 50 ppm halogen content.

10. A composition comprising:
from about 50 wt % to about 90 wt % of a polycarbonate having a weight average molecular weight of from about 15,000 to about 50,000 daltons;
from about 3 wt % to less than 9 wt % of acrylonitrile-butadiene-styrene (ABS), methacrylate-butadiene-styrene (MBS), or a mixture thereof, having from about 15% to about 80% grafted polybutadiene;
from about 5 wt % to about 16 wt % of an aryl phosphate having a molecular weight of from about 350 to about 1000 daltons;
from about 1 wt % to about 15 wt % of a non-rubber grafted SAN copolymer having a weight average molecular weight of from about 70,000 to about 170,000 daltons; and
from about 0.3 wt % to about 5.0 wt % of a combination of a silicone-containing functionality and fumed silica, wherein:
the silicone-containing functionality comprises from about 0.1% to about 10% vinyl units and from about 0.1% to about 20% silicone linkages of T or Q structure;
the fumed silica has a surface area of from about 100 to about 300 m$^2$/g when measured per ASTM D1993, a weight loss on drying at 300° C. of less than 15 wt %, an aggregate particle size of from 0.1 μm to 1.0 μm and less than 0.1% crystalline silica; and
the fumed silica is present in an amount of from about 5 wt % to about 50 wt % of the combination; and
wherein the composition has a MVR of at least 15 cc/10 minutes when measured at 260° C./2.16 Kg per ASTM D1238, a UL-94 rating of at least V-1 at 2.0 mm, and a change in melt viscosity when held at 260° C. for 30 minutes of less than 15% from the initial melt viscosity, when measured per ASTM D4440.

11. The composition of claim 10, wherein the composition has less than 50 ppm of halogen content.

12. The composition of claim 10, wherein the combination of the silicone-containing functionality and fumed silica contains from about 20 to about 50 wt % fumed silica.

13. The composition of claim 10, having a notched Izod impact strength at 23° C. of 480 J/m or greater when measured per ASTM D256 and a heat distortion temperature at 1.82 MPa of 75° C. or greater when measured per ASTM D648.

14. The composition of claim 10, wherein the composition has less than 50 ppm of antimony, lead, cadmium, mercury, arsenic, thallium, or mixtures thereof.

15. The composition of claim 10, further comprising 0.1 to 10.0 wt % of a silica-alumina containing composition titanium dioxide, wherein the titanium dioxide has a particle size of less than 5 microns and has been passivated by treatment with a silicon compound selected from the group consisting of hydrogen silanes, $C_1$ to $C_3$ mono-alkoxy silanes, $C_1$ to $C_3$ di-alkoxy silanes, and $C_1$ to $C_3$ tri-alkoxy silanes.

16. The composition of claim 10, wherein the aryl phosphate has less than 5% of triphenyl phosphate.

17. The composition of claim 10, further comprising from about 1 wt % to about 30 wt % of a mineral comprising talc or kaolin clay, wherein the mineral has a particle size of less than 10 microns and has a weight loss at 300° C. of less than 5 wt %.

18. The composition of claim 10, further comprising from about 0.001 wt % to about 0.3 wt % of a stabilizer selected from the group consisting of phosphites, phosphonites and hindered phenols.

19. The composition of claim 10, wherein the polycarbonate is a branched polycarbonate that has been branched with from about 0.01 mole % to about 0.5 mole % of a trifunctional phenol.

20. The composition of claim 10, having less than 50 ppm of a polytetrafluoroethylene.

* * * * *

UNITED STATES PATENT AND TRADEMARK OFFICE
CERTIFICATE OF CORRECTION

PATENT NO. : 8,158,701 B1
APPLICATION NO. : 13/019443
DATED : April 17, 2012
INVENTOR(S) : Robert Russell Gallucci et al.

Page 1 of 1

It is certified that error appears in the above-identified patent and that said Letters Patent is hereby corrected as shown below:

Title Page Item (54) and Col. 1, line 2, Title "COMPOSTIONS" should be changed to "COMPOSITIONS"

Signed and Sealed this
Twelfth Day of June, 2012

David J. Kappos
*Director of the United States Patent and Trademark Office*